Dec. 11, 1934.    H. AHOLA    1,983,516

COMBINED PROTRACTOR, BEVEL GAUGE, AND MITERING SQUARE

Filed Feb. 28, 1934    3 Sheets-Sheet 1

Harold Ahola
INVENTOR

Samuel S. Jacobson
ATTORNEY

Dec. 11, 1934.  H. AHOLA  1,983,516
COMBINED PROTRACTOR, BEVEL GAUGE, AND MITERING SQUARE
Filed Feb. 28, 1934  3 Sheets-Sheet 2
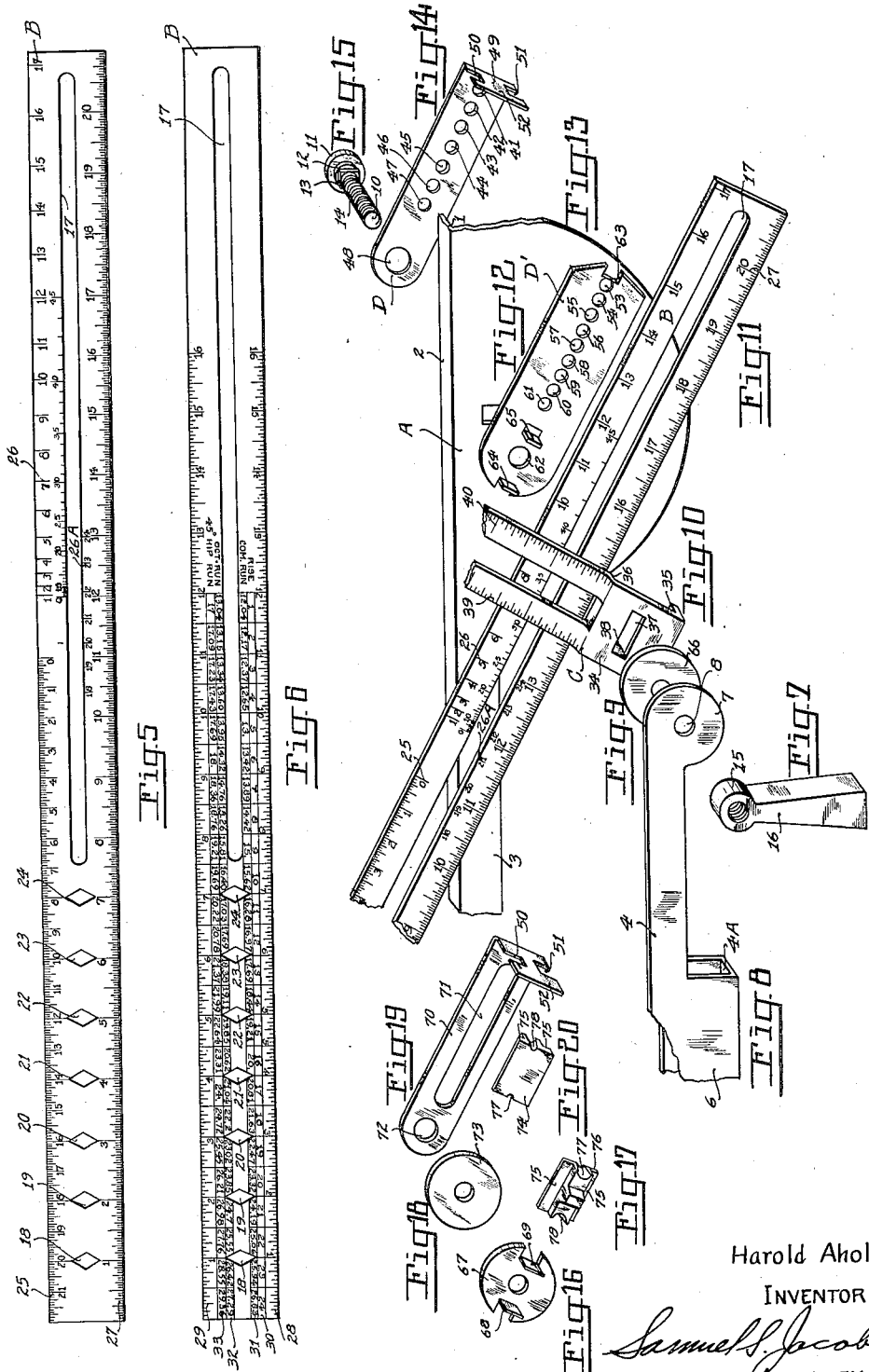
Harold Ahola
INVENTOR
Samuel S. Jacobson
ATTORNEY Harold Ahola
INVENTOR
Samuel S. Jacobson
ATTORNEY Patented Dec. 11, 1934

1,983,516

UNITED STATES PATENT OFFICE 1,983,516

COMBINED PROTRACTOR, BEVEL GAUGE, AND MITERING SQUARE

Harold Ahola, Portland, Oreg., assignor to Technical Tool Company, a corporation of Oregon Application February 28, 1934, Serial No. 713,292
In Canada May 22, 1933

7 Claims. (Cl. 33—94)

My invention relates generally to protractors, gauges, mitering squares and analogous implements for measuring angles, computing rises, bevel cuts and other measurements and the invention particularly relates to a combined protractor, bevel gauge and mitering square adapted for use by engineers, builders, joiners and others desirous of effecting and facilitating the measurement of polygonal angles, rises and other measurements between two or more points.

This invention has particular relation to an Improvement in a bevel gauge described in my prior United States Letters Patent No. 1,857,129 issued May 10, 1932, and to an Improvement in a bevel gauge, described in my prior United States Letters Patent No. 1,947,448.

I am aware that several different kinds of implements, such as protractors, bevel gauges, trisquares, dividers, frame squares and other analogous implements, have been created and that each of them have met with at least a modicum of success. However, I do not believe that any one has produced an instrument whose elements are combined, interconnected and arranged so that, by adjustment, several different implements may be provided for various and sundry uses and functions; this without effecting in the slightest, but in fact, materially aiding in producing a simple and compact arrangement adapted for easy handling.

The invention is especially adapted for facilitating the cutting of rafters, stair cases and various polygonal bevels usually necessary in construction work of all kinds. The invention may be used with equal facility in measuring off sheet metal, structural steel, boiler plate and other substances.

The primary object of my invention is to provide a device composed of a plurality of interconnected members which are subject to various simple adjustments in order to produce such tools as a miter square, protractor, adjustable bevel gauge, triangle, tri-square, divider and analogous tools.

An additional object of the invention is to eliminate as many disadvantages inherent in each tool which forms a part of my combination as is possible and at the same time improve and enlarge their use without effecting their operation.

An equally important object of the invention is to provide a device which, while capable of performing a multiplicity of functions, is constructed in such manner that the several interconnected members may be easily folded into a compact and manageable form when not in use.

Another object of my invention is to provide an instrument which will enlarge the range of functions which the various tools incorporated therein are capable of performing and at the same time overcome the inherent weaknesses of each tool when they are used independently of each other.

Still another object of my invention is to provide an instrument whose members are simple, light in weight, durable in construction and conducive to economical manufacture and which may be readily assembled and conveniently adjusted for any use for which the instrument may be selected.

A further object of my invention is to provide a device which, when the measurement desired has been determined, may be set in fixed position, so that the device may serve to make any number of measurements with great facility.

To accomplish these and other objects which will become apparent from the detailed description which is to follow, I have combined an arcuate data-plate, or protractor which is adapted for laying down and measuring angles, a straight-edge or arm which extends from the top of and is rigid with the data-plate, a ruler which is slidably and pivotally adjustable relative to the data-plate, and to a demountable and reversible right angle arm which is pivotally connected and adjustable relative to the data-plate and sight-gauges which are pivotally connected and movable relative to the data-plate.

All these members are interconnected and retained relative to each other in operative or inoperative position by retaining and locking means. The data-plate, straight-edge, rule and right angle arm are provided with scales, tables and other graduations adapted for making computations and measurements at the time the instrument is used.

In order that the invention and its mode of operation may be readily understood by persons skilled in the art, the details of construction of the invention to be hereinafter more fully described and claimed, are illustrated in the accompanying drawings forming a part hereof in which there is illustrated, by way of example, two complete embodiments of the invention and some modifications in structural details thereof, in which the members are combined and arranged according to the best mode thus far devised for the practical application of the principles of my invention.

Figure 5 is an enlarged top, plan view of the face of the ruler shown in Figure 1 showing the various indicia disposed upon said face and indicating the position of the slot and the openings incorporated within the body of the ruler.

Figure 6 is a view of the reversed side of the ruler shown in Figures 1 and 5.

Figure 4:
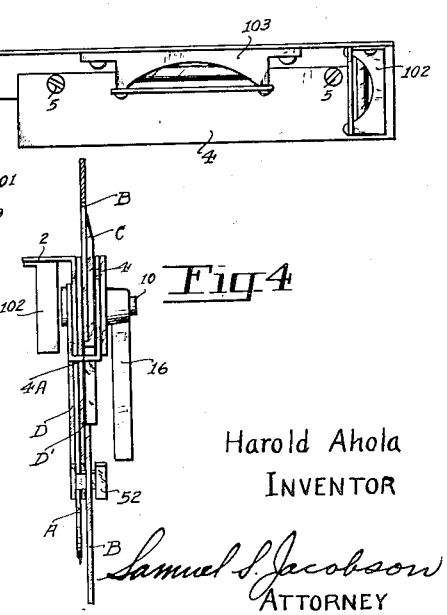
Figure 4 is an end view of the instrument illustrated in Figure 1 taken on line 4—4 of said figure looking in the direction indicated and showing more graphically the effective means for locking the various interconnected members against movement relative to each other and showing also their relationship to each other and to the channel formed by the arm or straight-edge and the channel-member.

Figures 7 to 15 inclusive illustrate the relative positions occupied by the several interlocking members immediately prior to assembling them in working relationship as shown in Figure 4, wherein:

Figure 7 is a perspective view of the locking member;

Figure 8 is a fragmentary, perspective view of the channel-member;

Figure 9 shows a washer;

Figure 10 is a fragmentary, perspective view of the angle-arm;

Figure 11 is a fragmentary, perspective view of the ruler;

Figure 12 is a perspective view of one of the sight-gauge-members;

Figure 13 is a fragmentary, perspective view of the data-plate or protractor;

Figure 14 is a perspective view of the other sight-gauge-member; and

Figure 1:
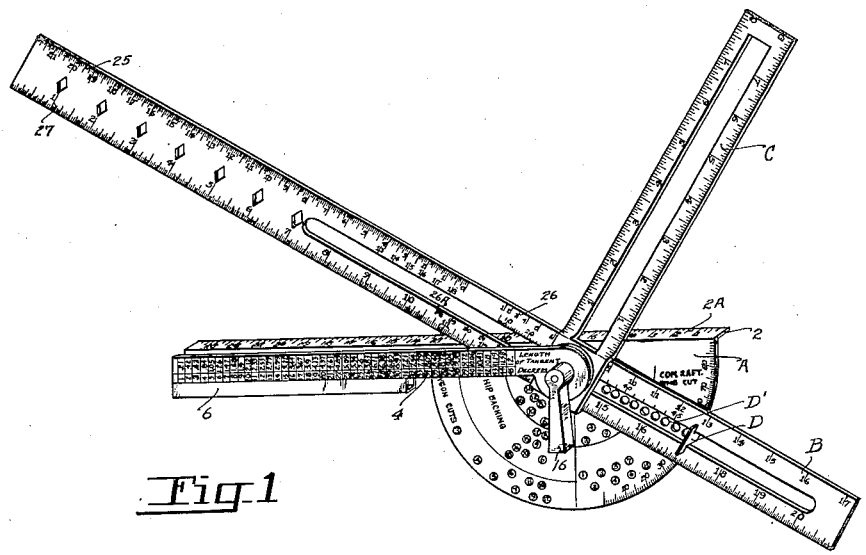
Figure 1 is a perspective view of the instrument which embodies my invention illustrating the relative position of the various members and parts when the same are assembled in operating position and showing the ruler and demountable and reversible angle-arm at right angles to each other to form a tri-square.

Figure 15 shows the locking-bolt adapted for cooperatively coacting with the locking-member to retain the interlocking members in working relationship as shown in Figures 1 and 14.

Figures 16 to 20 inclusive illustrate modified forms of some of the elements shown in Figures 7 to 15 inclusive, wherein:

Figure 16 shows a locking-washer;

Figure 17 shows a sliding-sight-gauge which normally rides in the slot formed with the ruler;

Figure 18 shows a spacing-washer;

Figure 19 shows a perspective view of a slotted sight-gauge-member; and

Figure 20 shows the other sliding-sight-gauge which normally rides in the slot formed in the slotted-gauge-member.

Figure 21:
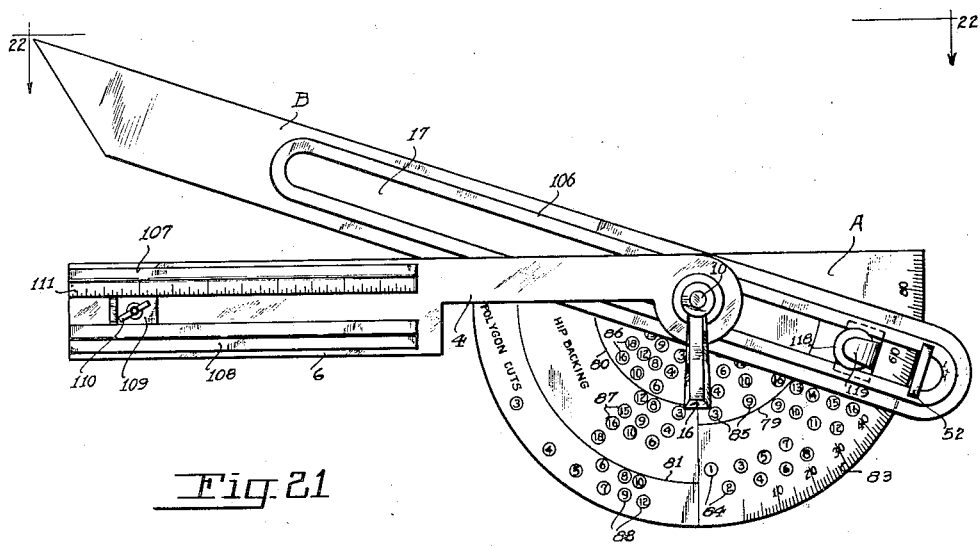

Figure 21 is a side view of a modified form of the instrument which embodies my invention illustrating a somewhat different type of ruler, different type of sliding-sight-gauge and a sliding-sight-gauge-member disposed in the data-plate arm for measuring or gauging depths.

Figure 22:
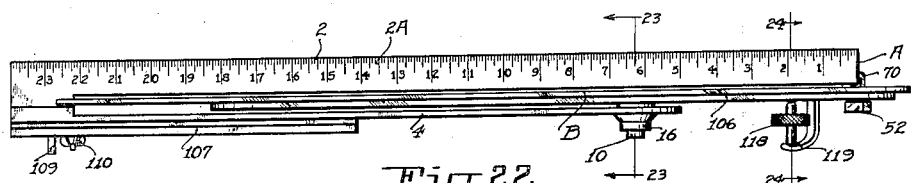

Figure 22 is a top or edge view of the instrument shown in Figure 21 taken on line 22—22 of said figure looking in the direction indicated.

Figure 23:
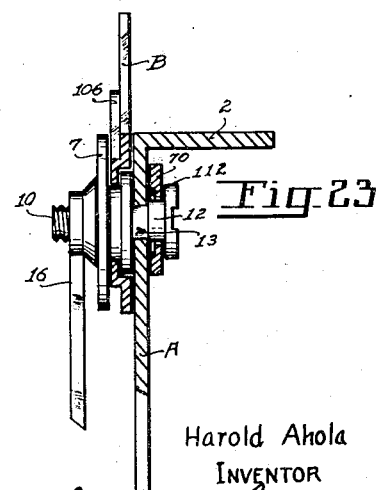

Figure 23 is a fragmentary, side view partially in section, of the instrument shown in Figures 21 and 22 taken on line 23—23 of Figure 22 looking in the direction indicated and illustrating the interlocking relationship between the various elements embodied in my invention.

Figure 24:
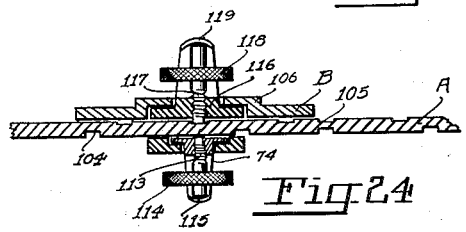

Figure 24 is a sectional, detailed view of the sliding-sight-gauges taken on line 24—24 of Figure 22 looking in the direction indicated.

Figure 25:
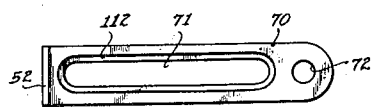

Figure 25 is a plan view of the inner face of the slotted-sight-gauge-member.

Like reference characters refer to corresponding parts throughout the several views in the drawings.

By way of example and not for the purpose of limitation, I have shown and prefer to utilize a semi-circular data-plate and protractor designated generally by reference character A which is adapted for displaying one hundred eighty degrees (180°) of a circle. This data-plate and protractor A is provided on both sides with measuring indicia and other data to be used in connection with the instrument embodying my invention as will hereinafter more fully appear. A flange 1, which forms the straight-edge 2, is fashioned from and made integral with the data-plate A. A second flange 3 is fashioned from and made integral with the data-plate A and flange 1, and extends in the same plane as the said plate. A U-shaped channel-member 4 is removably and rigidly secured to flange 3 by any suitable means, as by screws 5, and the side 6 of said channel-member is disposed in a parallel plane to the flange 3 thus forming a channel-way 4A therebetween. It will be seen that by this arrangement the data-plate and protractor A, the straight-edge 2 and the channel-member 4 form a substantially rigid frame for the remainder of the elements which will be described forthwith as well as a channel-way in which the pivoted and/or adjustable elements of the instrument may be inserted when desired. The free end of the channel-member 4 has a head 7 through which extends an opening 8. This opening is in direct alignment with the square-opening 9 that is disposed through the semi-circular-plate A equidistant from the circumference. A clamping-bolt 10 has a head 11, a round-portion 12 immediately adjacent said head, a square-portion 13 immediately adjacent the round-portion adapted for intimate placement within the square-opening 9, and a threaded-portion 14. The clamping-bolt, by extending through the openings 8 and 9, forms a journal for the pivoted and adjustable elements yet to be described. A locking-nut 15, having a lever-handle 16, is capable of being threadably disposed about the threaded-portion 14 of the clamping-bolt 10. By this arrangement the pivotal and adjustable elements yet to be described are held in fixed relation with each other as will more fully appear herein.

In Figures 5 and 6 are shown a flat ruler designated generally by reference character B which has a slot 17 longitudinally extending through the major portion of its body. This slot permits the ruler to be slidably adjustable about the clamping-bolt 10 which passes therethrough as well as permitting the plate to be swung about the bolt as a pivotal center. A series of openings 18, 19, 20, 21, 22, 23 and 24 are disposed through the remainder of the body of the ruler at equal predetermined distances, said openings being diamond shaped for the purpose of accommodating the flat point of a pencil or other means of marking.

It is obvious that because these openings are equidistant from each other, the ruler B may be placed perpendicular to the straight-edge 2, the ruler then moved along the clamping-bolt 10 and adjusted thereon until the opening 24 is equidistant from the straight-edge 2 and then locked in position to permit markings to be made and the openings to act as guides for the drawing of a plurality of parallel lines. It is further obvious from the disclosure that the ruler may be adjusted with respect to the straight-edge so that opening 24 is only one-half the distance from the straight-edge to opening 23; one-third the distance to opening 22; one-fourth the distance to opening 21 and so forth. When the ruler is placed in such a position with respect to the straight-edge, the instrument in question may be effectively used for ripping a plank into several strips of equal width by placing the straight-edge of the instrument along the edge of the plank and marking the plank with parallel lines for assisting in performing the function mentioned.

The ruler has disposed on each side thereof certain scales and other indicia which are deemed necessary for permitting the proper and effective use of the instrument as a whole. Reference numeral 25 represents a scale of one-half inch to the foot divided into twelfths and also six inches to the foot divided into twenty-two inches and twelfths. Reference character 26 represents a measuring table for use in rise in inches per foot run in full measure, reference character 26A represents a continuation of table 26 for rise in inches per foot run, the run being in one-half measure. Reference character 27 represents a scale of twelve inches to the foot divided into twenty-fourths and one inch to the foot divided into twenty-fourths. On the reverse side of the ruler, as shown in Figure 6, reference characters 28 and 29 indicate sixteen inch scales divided into sixteenths of an inch. Reference character 30 is a table which indicates the rise in inches per foot from one to twenty-four inches rise per foot of run. Reference character 31 indicates the common run in inches for the selected rise in inches per foot of run. Reference character 33 indicates the forty-five (45°) degree hip and valley runs in inches for the selected rise in inches per foot of run.

An angle-arm, designated generally by reference character C, is removably mounted on the ruler B. The angle-arm is provided at one end with an offset-head 34. A flange 35 is provided adjacent its end and a shoulder 36 is fashioned at the joint of the head with the remainder of the angle-arm. A rectangular-opening 37 is disposed through the head and lugs 38 extend downwardly therefrom. By this construction the shoulder 36 and the flange 35 intimately fit over the opposite sides of the ruler when the latter is positioned perpendicular to the blade and the lugs 38 fit into the slot 17 of the ruler thereby providing a rigid relationship between the ruler and angle-arm when the clamping-bolt 10 passes through the opening 37. When the angle-arm is perpendicular to the ruler and held rigidly in place, a triangle is formed which may be swung, if desired, about the clamping-bolt 10 as a pivot or the angle-arm alone may be swung on the clamping-bolt as a center in order to position the angle-arm parallel to the ruler, and thereby be placed into the channel-way 4A formed between flange 3 and side 6 of the channel-member 4. When this is accomplished, the instrument is in compact condition for storing or transportation. The angle-arm may also be swung through an arc of one hundred eighty (180°) degrees in order to be placed at right angles to the other side of the ruler.

The angle-arm C has disposed on each side thereof certain measuring indicia which are deemed necessary for permitting the proper and effective use of the instrument as a whole. Reference numerals 39 and 40 indicate scales in inches divided into sixteenths which are on both sides of the angle-arm.

A sight-gauge-member, generally designated by reference character D, has a series of openings 41, 42, 43, 44, 45, 46 and 47 disposed therethrough equidistant from each other for a purpose which will become apparent from the description to follow. An opening 48 is disposed through one end of the sight-gauge-member D which fits the rounded portion 12 of the clamping-bolt 10, and a flange 49 is provided at its extremity. The flange 49 has notches 50 and 51 formed therein, thus forming a T-shaped-head 52 which projects upwardly adjacent the periphery of the data-plate A. The notches 50 and 51 permit the insertion of the head 52 into slot 17 of the ruler and form guides for the sight-gauge-member D when the ruler is moved on its pivot or longitudinally adjusted. Thus the ruler B is free from the sight-gauge-member D for its longitudinal adjustment relative to the data-plate A and said sight-gauge-member, and when the clamping-bolt 10 is inserted into opening 48 so that the sight-gauge-member D is adjacent the data-plate, it is radially but not longitudinally movable with the ruler as the ruler is swung on its pivot. By this arrangement also the sight-gauge-member D, through its pivotal connections with the clamping-bolt 10 and the slot 17 of the ruler, assists in making comparatively easy the longitudinal adjustments of the ruler, or the triangle formed by the ruler and angle-arm.

Another sight-gauge-member, generally designated by reference character D', also has a series of openings 53, 54, 55, 56, 57, 58, 59, 60 and 61 disposed therethrough equidistant from each other for a purpose which will become apparent from the description to follow. An opening 62 is disposed through one end of the sight-gauge-member D' and a notch 63 is formed at the other extremity. Lugs 64 and 65 are formed and project outwardly from the sight-gauge-member D' on each side of opening 62. The notch 63 fits around the neck of the T-shaped-head 52 formed by notches 50 and 51 and the lugs 64 and 65 are inserted into the slot 17 of the ruler and opening 37 of the angle-arm, when the clamping-bolt 10 is passed through opening 62 of the sight-gauge-member D'. It will be seen that by this construction the sight-gauge-member D' is held in comparatively fixed position relative to the face of the data-plate and ruler although the longitudinal adjustment of the ruler is not hampered thereby.

A washer 66 is mounted on the clamping-bolt adjacent the head 34 of the angle-arm.

A somewhat similar arrangement is illustrated in Figures 16 to 20 inclusive wherein there is shown a locking and spacing-washer 67 which is capable of being mounted on the clamping-bolt 10 between the ruler B and the data-plate A. This washer has centering and retaining-lugs 68 and 69 extending outwardly therefrom which project through the slot 17 of the ruler and into the opening 37 of the head 34 of the angle-arm C. In this manner, regardless of the relative positions of the ruler and angle-arm, they are rigidly held together as a triangle and adapted for pivoted adjustment on the clamping-bolt for use in laying off right angles in various positions and for numerous purposes. A radially extending sight-gauge-member 70, having a longitudinal-slot 71 and an opening 72 therein, is mounted on the clamping-bolt 10 next to the washer 73 and this sight-gauge-member, which is mounted on the clamping-bolt at the face of the data-plate A opposite the ruler, is connected to the ruler and movable with relation to the clamping-bolt as a pivot, by structure identical to that already mentioned in describing sight-gauge-member D and embodied in T-shaped-head 52. A setting-device or gauge 74, having guide-grooves 75 longitudinally thereof, is slidably positioned in slot 71 of the ruler. Gauge 74 is positioned on one side of the data-plate and gauge 76 on the other side of the data-plate. Each of these gauges 74 and 76 have sight-grooves 77 and 78 which may be used to determine the relative positions of the ruler and angle-arm with respect to each other as indicated by the indicia on the face of the data-plate. The gauges 74 and 76 are guided by the slots 71 and 17 respectively in their adjusting movements toward or away from the clamping-bolt 10. It will be seen that this modified structure illustrated in Figures 16 to 20 inclusive may be used with equal facility but my present mode of construction contemplates the use of a structure heretofore described.

The straight-edge 2 has a one-half inch scale to the foot divided into twelfths or a scale of six inches to the foot divided into twelfths as shown by reference numeral 2A.

The data-plate A has affixed on both faces thereof, in predetermined positions, various scales, tables, tabulations and graduations which are essential for the accurate use of the ruler, the triangle formed by the angle-arm and ruler, and the sight-gauge-members.

Figure 2:
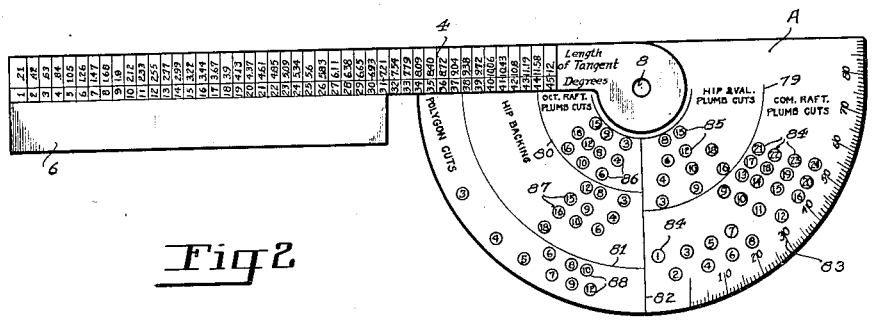
Figure 2 is a side view of the data-plate or protractor and straight-edge or arm shown in Figure 1 showing sundry indicia thereon.

In Figure 2 is shown various tabulations on the face of the data-plate A arranged in arcuate spaces formed by the concentric lines 79, 80 and 81 and by the radial-line 82. Reference character 83 indicates 1 to 90 degrees to be used for determining and protracting angles with the assistance of the ruler; reference numeral 84 indicates a plurality of predetermined tabulations which may be placed in registerable alignment with openings 54 to 57 inclusive disposed through the sight-gauge-member D' and which are cooperatively used with said sight-gauge-member and ruler B to obtain the correct common rafter plumb cuts; reference character 85 indicates a plurality of predetermined tabulations which may be placed in registerable alignment with the openings 58 to 61 inclusive disposed through sight-gauge-member D' and which are cooperatively used with said sight-gauge-member and the ruler B to obtain the correct hip and valley plumb cuts; reference character 86 indicates a plurality of predetermined tabulations which may be placed in registerable alignment with openings 59 to 61 inclusive disposed through the sight-gauge-member D' and which is cooperatively used with said sight-gauge-member and ruler B to obtain the correct octagonal rafter plumb cuts; reference character 87 indicates a plurality of predetermined tabulations which may be placed in registerable alignment with openings 55 to 58 inclusive disposed through the sight-gauge-member D' and which are cooperatively used with said sight-gauge-member and ruler B to obtain the correct hip backing cuts; and reference numeral 88 indicates a plurality of predetermined tabulations which may be placed in registerable alignment with openings 53 and 54 disposed through the sight-gauge-member D' and which are cooperatively used with said sight-gauge-member and ruler to obtain the correct polygon cuts.

Figure 3:
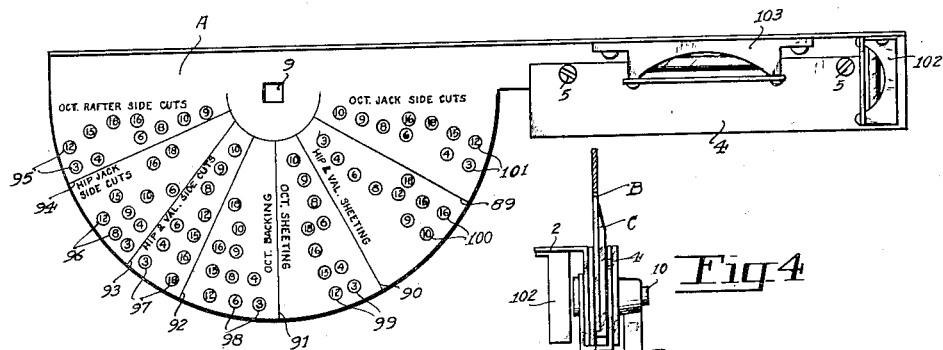
Figure 3 is a side view of the reverse side of the data-plate or protractor and straight-edge or arm shown in Figure 2 showing other indicia thereon.

In Figure 3 are shown various tabulations on the other face of the data-plate A arranged in segmental spaces formed by the radial-lines 89, 90, 91, 92, 93 and 94. Reference numeral 95 indicates a plurality of predetermined tabulations which may be placed in registerable alignment with openings 41 to 47 inclusive disposed through the sight-gauge-member D and which are cooperatively used with said sight-gauge-member and ruler B to obtain the correct octagonal rafter side cuts; reference numeral 96 indicates a plurality of predetermined tabulations which may be placed in registerable alignment with openings 41 to 45 inclusive disposed through the sight-gauge-member D and which are cooperatively used with said sight-gauge-member and ruler B to obtain the correct hip and jack side cuts; reference numeral 97 indicates a plurality of predetermined tabulations which may be placed in registerable alignment with openings 41 and 47 inclusive disposed through the sight-gauge-member D and which are cooperatively used with said sight-gauge-member and ruler B to obtain the correct hip and valley side cuts; reference character 98 indicates a plurality of predetermined tabulations which may be placed in registerable alignment with openings 41 to 45 inclusive through the sight-gauge-member D and which are cooperatively used with said sight-gauge-member and ruler B to obtain the correct octagonal backing cuts; reference character 99 indicates a plurality of predetermined tabulations which may be placed in registerable alignment with openings 41 to 47 inclusive disposed through sight-gauge-member D and which are cooperatively used with said sight-gauge-member and ruler B to obtain the correct octagonal sheeting cuts; reference character 100 indicates a plurality of predetermined tabulations which may be placed in registerable alignment with openings 41 to 47 inclusive disposed through sight-gauge-member D and which are cooperatively used with said sight-gauge-member and ruler B to obtain the correct hip and valley sheeting cuts; and reference character 101 indicates a plurality of predetermined tabulations which may be placed in registerable alignment with openings 41 to 47 inclusive disposed through sight-gauge-member D and which are cooperatively used with said sight-gauge-member and ruler to obtain the correct octagonal jack side cuts.

While this description covers the use of sight-gauge-members D and D' constructed as shown in Figures 1, 13 and 14, it is obvious that the same results can be obtained by the use of sight-gauge-members 70, 74 and 76, since the tabulations affixed to both faces of the data-plate A remain the same regardless of the type of sight-gauge-members that are used.

In Figure 3 the instrument is shown equipped with spirit-levels 102 and 103. Spirit-level 102 is attached to the under side of the flange 1 and spirit-level 103 is attached to the flange 1 and channel-member 4 at right angles to spirit-level 102. Both of these levels may be used in connection with the measuring instrument as a whole.

In Figures 21 to 25 inclusive there are shown some of the elements which are modified but which still embody the invention and which perform substantially the same functions as are performed by the previously described elements. Data-plate and protractor A is constructed in practically the same manner as before except that the tabulations on the faces thereof are disposed in recesses or sockets formed in both faces of the data-plate as shown at 104 and 105. Ruler B is modified so that an offset or flange 106 is fashioned from the ruler and is adjacent the slot 17 which extends through the greater portion of the ruler. The remainder of the ruler contains, on both its sides, various indicia suitable for use with the structure illustrated herein.

Angle-bars 107 and 108 are secured to face 6 of channel-member 4 in parallel spaced relationship with each other thus forming guides for a sight-gauge 109 slidably disposed between the angle-bars 107 and 108 and this gauge-member may be fixedly positioned with respect to the angle-bars by any suitable means, as by a wing-nut 110. Graduations 111, reading in inches, are scribed upon the face of the angle-bar 107 and these graduations assist in placing the sight-gauge 109, so that it may be used for measuring depths.

Gauge-members 70, 74 and 76 are slightly modified in the drawings illustrated in Figures 21 to 25 inclusive. The gauge-member 70 has the slot 71 and a groove 112 formed adjacent the slot in which the setting-gauge 74 rides. The setting-gauge 74 has a setting-screw 113 threadably disposed therein which is turned by knurled-head 114 whereby the smooth end of the screw 113 may be inserted into any one of the recesses or sockets 104. The setting-screw 113 is retained in position by retaining-spring 115. The gauge-member 76 rides within the slot 17 of the ruler B and is guided by the flange 106. The gauge 116 has a setting-screw 117 threadably disposed therein which is turned by knurled-head 118 whereby the smooth end of the screw 117 may be inserted through any one of the recesses or sockets 105. The setting-screw 117 is retained in position by retaining-spring 119. By this arrangement the setting-screws 113 and 117, by virtue of the pivotal connection of the gauge-members 74 and 76 with the ruler B, may be longitudinally and angularly moved until the desired sockets or recesses 104 and 105 are located. It will be seen that the desired angle of the ruler may be obtained by setting the smooth end of the setting-screws in their respective sockets or recesses, and when this is done, by turning the locking-nut 15, the interconnected members are placed in set position and the instrument may be used as desired.

The instrument, both in its preferred and modified form, may be used in conjunction with a hand-transit and a compass. This is accomplished by placing the transit on the under side of the straight-edge 2 and the compass on the outer periphery or circumference of the data-plate and protractor A. By maintaining the straight-edge level and by moving the compass about the circumference of the data-plate, the precise level and directional location which is sought may be determined.

*Modus operandi*

It will thus be seen that the objects of the invention stated hereinbefore may be accomplished by the illustrative embodiments shown in the drawings. To indicate the variety of uses to which my invention may be put and its mode of operation, the following hypothetical problems may be solved:

Assuming that an angle of forty-three (43°) degrees is desired to be marked off on a given surface, the ruler B is rotated on its pivot, so that its edge carrying tables 25 and 26 is directly aligned with the 43rd degree mark shown on the protractor A. In order to project this angle on the given surface the same edge of the ruler B is used as a guide for the marking.

Assuming that a plumb cut of a common rafter is desired to be made for an eleven inch rise per foot of run, the gauge-member D' is rotated, so that opening 54 is placed in registerable alignment with the tabulation 11 of the tabulation group indicated by reference numeral 84. Since gauge-member D' is indirectly connected to the ruler, it cooperatively rotates with the ruler. By aligning the opening 54 with tabulation 11, the angle-arm C and ruler B are aligned for the correct seat cut for the rafter, the angle-arm C giving the correct marking for the seat or horizontal portion of the cut, and the ruler B is correctly set for marking the cut at the peak of the rafter. In order to obtain the correct length of the rafter in question the ruler B is slidably positioned, so that tabulation 11 of the table 26 is aligned with the edge of the angle-arm C that is immediately adjacent the scale indicated by reference character 39. If it is assumed that the run is ten feet, the length of the rafter is indicated by ten lengths of the ruler B from tabulation 11 of scale 26 to the terminal end of the ruler B reading through scale 25. In this manner plumb cuts for common rafters and lengths therefore are obtained.

Assuming that a hip and valley side cut is desired to be made for a fifteen inch rise per foot of run, the gauge-member D is rotated, so that opening 43 is placed in registerable alignment with tabulation 15 of the tabulation group indicated by reference character 97. Since the gauge-member D is connected to the ruler, the ruler B is also rotated. Then when the straight-edge 2 of the data-plate A is placed against the vertical face of the rafter, the aforementioned edge of the ruler B will indicate upon the edge of the rafter, the correct side cut.

In order to use the rise-table 26A, the operation is the same as for the table 26 except that the length indicated thereby is doubled for each foot of run.

Manifestly the construction and the arrangement shown is capable of modification, but I reserve the right to such changes in the form, construction and arrangement of parts as will not depart from the spirit of the invention and which are within the scope of the subjoined claims.

Having thus described my invention, what I claim as new and useful and upon which I desire to secure Letters Patent is:

1. In a measuring instrument, a semi-circular data-plate having a straight-edge connected therewith, a ruler which can be set at any angle with respect to the straight-edge, an angle-arm rigidly but movably secured to the ruler to thereby occupy a pre-determined angular position thereto, whereby upon rocking the ruler relative to the data-plate the angle defined by the ruler and the angle-arm may be entered in various positions relative to the straight-edge of the said data-plate, a pair of sight-gauge-members, one of which is provided with a T-shaped projection that passes through and cooperates with a longitudinal slot disposed through the ruler, the other of which is provided with means for connecting said sight-gauge-member to the T-shaped projection of the first mentioned sight-gauge-member, said sight-gauge-members being pivotally secured with respect to the data-plate whereby upon swinging the ruler about its pivot the sight-gauge-members are swung about their pivots, and said sight-gauge-members permitting the angle-arm to be set in various selectively determined relations with respect to the ruler without effecting the longitudinal movement of the ruler with respect to the data-plate.

2. The combination with a data-plate with which is combined a protractor, a slotted ruler pivotally and slidably disposed at one side of said plate, a detachable and reversible angle-arm movably secured to said ruler to normally form a right angle, a sight-gauge-member pivotally disposed at the other side of said plate, means on said sight-gauge-member for coacting with the ruler to thereby transfer rotational movement from the ruler to the sight-gauge-members, a second sight-gauge-member pivotally disposed on the same side of said plate as the ruler, means on said second sight-gauge-member for coacting with the means on said first mentioned sight-gauge-member to thereby permit the transfer of rotational movement from the ruler to the said second sight-gauge-member, and means for locking said data-plate, angle-arm and ruler against movement with respect to each other.

3. An instrument as characterized in claim 2 wherein the angle-arm has an offset head adapted to fixedly engage said arm to the ruler and wherein each of the sight-gauge-members have a series of openings therein in registerable alignment with indicia disposed upon the data-plate whereby the angular relationship between the ruler, the arm, and the straight-edge may be selectively predetermined.

4. An instrument as characterized in claim 2 wherein the angle-arm has an offset head adapted to fixedly engage said arm to the ruler and wherein said head has a pair of lugs which are inserted into the slot of the ruler and wherein the second sight-gauge-member has a pair of lugs which are inserted into the slot of the ruler and which are positioned adjacent the lugs of the offset head.

5. In a measuring instrument of the straight-edge type including a semi-circular data-plate, the combination with a slotted ruler and angle-arm forming an angle therewith, and means for pivoting and clamping said ruler with relation to the plate, a sight-gauge-member pivotally disposed at one side of the data-plate, means fashioned from said sight-gauge-member for connecting said gauge-member to the ruler at the other side of the data-plate, said sight-gauge-member having a series of openings therethrough directly aligned with indicia disposed on said data-plate, a second sight-gauge-member pivotally disposed at the other side of the data-plate, means fashioned from said second-sight-gauge-member for connecting said second-gauge-member to the first mentioned sight-gauge-member for connecting said second gauge-member to the ruler and angle-arm, said second sight-gauge-member having a series of openings therethrough directly aligned with indicia disposed on said data-plate.

6. A measuring instrument as characterized in claim 5 wherein the straight-edge is extended beyond the data-plate and wherein there is included a channel-member in spaced relation with the extended straight-edge thereby forming a channel-way whereby the ruler and angle-arm may be placed therein, and means for locking the data-plate, ruler and angle-arm in rigid position for use.

7. The combination with an arcuate data-plate whose circumference contains in part angular graduations, a rotatable and slidable slotted angularly adjustable ruler, provided with graduations on each side thereof, pivoted with respect to said data-plate, a rotatable angularly adjustable angle-arm, provided with indicia on both sides thereof, pivoted with respect to the ruler but normally maintained in perpendicular relationship to said ruler, a pair of rotatably and angularly adjustable sight-gauge-members pivoted with respect to the ruler, angle-arm and sight-gauge-members, and a locking-member for clamping all of them in rigid relationship to each other.

HAROLD AHOLA.